3,262,782
MATTED ANTIHALATION LAYER FOR
PHOTOGRAPHIC MATERIALS
Helfried Klockgether, Leverkusen, Walther Cohnen, Cologne-Mulheim, and Peter Kruck, Cologne-Stammheim, Germany, assignors to Agfa Aktiengesellschaft, Leverkusen, Germany, a corporation of Germany
No Drawing. Filed Jan. 23, 1962, Ser. No. 168,272
Claims priority, application Germany, Feb. 8, 1961, A 36,682
8 Claims. (Cl. 96—84)

This invention relates to matted antihalation layers, the matting agent of which consists of heterogeneously dispersed cellulose esters of dicarboxylic acids.

It is common practice to provide photographic films with an anti-halation layer. This anti-halation layer can be arranged between the photographic emulsion layer and the support or can be arranged on the back of the support.

The anti-halation layer generally consists of:

(1) A dyestuff of suitable absorption characteristics, which is decolorized and/or dissolved in the photographic processing baths, and (2) A film forming binding agent which, when it is on the back of the support, can likewise be dissolved in the photographic processing baths.

Suitable film-forming binding agents for this purpose are, for example: copolymers of styrene and acrylic acid, vinyl isobutyl ether and maleic acid, vinyl-n-butyl ether and maleic acid, styrene and maleic acid according to U.S. Patent No. 2,077,789 and polyvinyl alcohol phthalates according to U.S. Patent No. 2,131,747.

An anti-halation layer has to meet particularly the following requirements:

(1) A good solubility in weak alkali.

(2) A lowest possible tendency to become detached from the support under the action of a high humidity and high temperature, and to be impressed in patches or even completely transferred on to the emulsion disposed in contact. In order to reduce this effect, the otherwise clear anti-halation layers are matted. Suitable matting agents for this purpose are fine-grained pigments such as colloidal silicon dioxide, colloidal talcum and others. Since the particles suspended in the binding agent are however quickly deposited, the production of a uniform coating is relatively difficult. Furthermore, these matting agents are not soluble in the photographic processing baths, but are only floated off, and this can easily lead to residues and soiling of the film.

We now have found that an excellent and uniform matting can be obtained by using, as matting agents, cellulose esters which contain dibasic aliphatic or aromatic acids at least partially as the acid component. Such cellulose derivatives are prepared by reacting cellulose acetates having an acetic acid content of 35–50%, advantageously 40–45%, with anhydrides of dibasic carboxylic acid, such as the anhydrides of malonic, succinic, maleic, citraconic and phthalic acids in suitable solvents such as dioxane, pyridine or glacial acetic acid. Since substantially only one carboxyl group of the dibasic carboxylic acids is esterified the resulting cellulose ester is soluble in alkali. The cellulose esters according to the invention should have a viscosity of 2–100 cp., advantageously 5–30 cp., measured in a 5% solution in acetone and water in a ratio by volume of 8:2 and acid numbers of 4–8, advantageously 4.8–6 cc. of an 0.5-molar solution of potassium hydroxide per gram of substance.

Practically all known alkali-soluble film formers which also satisfy the standards discussed above are suitable as binders for the anti-halation layer, for example, polycarbonates especially on the base of bis-hydroxyphenyl alkanes or copolymer of vinyl butyl ether and maleic acid, vinyl butyl ether, acrylonitrile and maleic acid or of styrene with maleic acid, acrylic acid or methacrylic acid, as well as ternary copolymers of styrene with acryonitrile and acrylic acid with acrylonitrile and methacrylic acid and maleic acid. It is for example also possible to use the binders described in Swiss patent specifications 167,824 and 181,723.

The copolymers are prepared by methods which are generally known. It is preferred to use those products which have a viscosity of 2–100 cp. and more especially 5–30 cp., measured in a 5% solution in ethanol.

The cellulose esters are used in a quantity of 1–10 parts of cellulose ester to 12 parts of binder of the anti-halation layer, the numerical data being related to the solid content. The matting is increased with an increasing amount of the cellulose ester.

The solvent mixtures are so adapted that copolymer and cellulose acetate-dicarboxylic acid ester are clearly dissolved therein, but so that the cellulose ester precipitates with the drying by more rapid evaporation of certain solvent components. If the cellulose ester remains in solution like the copolymer during the initial drying, no matting is obtained. If the copolymer is precipitated like the cellulose ester during the drying no coherent adhering anti-halation layer is formed. In order to prevent a coloring of the support the solvent mixtures should not soften the support.

These matted anti-halation layers according to the invention are readily soluble in weakly alkaline media and, despite the matting, have a very good resistance to abrasion. The resistance to transfer is clearly improved as opposed to anti-halation layers without matting agents or to anti-halation containing conventional matting agents such as colloidal silicon dioxide.

The following examples will illustrate various anti-halation layers according to the invention and methods of applying said layers to photographic light-sensitive films. It is to be understood that these examples represent preferred embodiments but are not to be considered as limiting the invention thereto.

*Example 1*

A foil of cellulose triacetate is coated with an anti-halation layer by applying the following solution:

7 g. of an anti-halo dyestuff according to British patent specification No. 790,023.
65 g. of a 20% solution of a copolymer of 1 mol of vinyl butyl ether and 1 mol of maleic acid methyl semiester,
2.0 g. of a cellulose acetate phthalate (viscosity of 39 cp. in a 5% solution in a mixture of acetone and water in a ratio of 8:2 and an acid number of 5.1) dissolved in 18 g. of a mixture of ethanol, ethyl acetate and benzene in equal parts by volume, said cellulose ester has been prepared by heating 1 part of cellulose diacetate and 1.5 parts of phthalic acid anhydride in pyridine. The reaction temperature was about 100° C.,
225 cc. of ethanol,
100 cc. of ethyl acetate,
100 cc. of butanol,
50 cc. of benzene.

The anti-halation layer thus obtained is superior as regards resistance to transfer and abrasion to an anti-halation layer which is not matted.

The resulting cellulose acetate foil containing the anti-halation layer can be used as a support for a multilayer color film material by applying in a manner well known on the other side of the foil the light sensitive silver halide emulsion layers and auxiliary layers.

Example 2

A foil of cellulose triacetate is treated with the following solution:

5 g. of an anti-halo dyestuff according to British patent specification No. 790,023
50 g. of a 20% solution of a copolymer of vinyl butyl ether, acrylonitrile and monomethyl maleate in the molar ratio 4:1:5 according to German Patent No. 1,028,881,
60 g. of a 10% solution of a cellulose acetate phthalate as in Example 1 in ethanol:ethyl acetate:benzene (1:1:1 ratio)
600 cc. of ethanol
50 cc. of butanol
150 cc. of ethyl acetate
50 cc. of butyl acetate
100 cc. of acetone.

The anti-halation layer thus obtained is substantially more densely matted than that described in Example 1. The resulting combination can be used as a support for a black and white film material.

Example 3

A polycarbonate foil on the basis of bis-hydroxyphenyl alkanes according to German patent specifications 1,001,586, 1,062,544, 1,606,710 is coated with an anti-halation layer by coating a solution with the following composition:

7 g. of an anti-halo dyestuff according to British patent specification 790,023,
30 g. of a 20 percent solution of a copolymer of 4 mols of vinyl butyl ether, 1 mol of acrylonitrile and 5 mols of maleic acid ethyl semiester according to German Patent No. 1,028,881,
6 g. of a polycarbonic acid ester of di-(4-hydroxy-3-carboxy-phenyl)-methane according to German Patent No. 1,035,472,
6 g. of a cellulose acetate maleic acid ester (viscosity of 8 cp. in 5 percent solution in acetone and water in the ratio 8:2 and an acid number of 4.8 cc. of an 0.5-molar solution of potassium hydroxide per 1 g. of substance), the product having been prepared by reacting 1 kg. of cellulose diacetate with 1.8 kg. of maleic acid anhydride in 1.9 litres of dioxane at a temperature of approximately 100° C.,
460 cc. of ethanol,
320 cc. of ethyl acetate,
75 cc. of butanol,
100 cc. of water.

The properties of an anti-halation layer matted in this way are superior to those of a non-matted layer.

The resulting polycarbonate film containing the anti-halation layer can be used as a support for the production of a film for the graphic arts.

A similar result is obtained, when the polycarbonate foil is replaced with a foil of a polyester on the basis of terephthalic acid and ethylene glycol.

Example 4

8 g. of an anti-halo dyestuff according to British Patent No. 790,023,
12 g. of a copolymer of styrene and maleic acid in the molar ratio 1:1,
3 g. of a cellulose acetate phthalate (of viscosity of 20 cp., measured as a 5% solution in acetone:water in a ratio of 8:2 and an acid number of 4.8) are dissolved in the following mixture of solvents;
600 cc. of ethanol,
50 cc. of butanol,
150 cc. of ethyl acetate,
50 cc. of butyl acetate,
150 cc. of acetone and applied to a polyethylene terephthalate foil. The anti-halation layer has excellent properties with regard to the resistance to abrasion and to transfer.

Example 5

8 g. of an anti-halo dyestuff according to British patent specification 790,023,
12 g. of a polycarbonic acid ester of di-(4-hydroxy-3-carboxy-phenyl)-methane according to German Patent No. 1,035,472,
4 g. of a cellulose acetate phthalate according to Example 4,
are dissolved in the following solvent mixture:
450 cc. of ethanol,
200 cc. of ethyl acetate,
200 cc. of butanol,
100 cc. of benzene, and applied to a cellulose triacetate foil. The anti-halation layer which is obtained can easily be dissolved off and has an excellent resistance to transfer. The resulting combination can be used as support for black and white film for reproduction purposes.

Having thus described our invention we now state that we believe our invention to be capable of numerous variations in method, apparatus and materials. For example the anti-halation layer according to the invention is not to be limited to the anti-halation dyestuffs previously mentioned and may comprise any suitable dyestuffs, e.g. Alkali Blue B (Color Index No. 704), Acid Blue (Color Index No. 707), Aurinebicarboxylic Acid (Schultz-Farbstofftabellen 1914, No. 557), Oxytolylaminofuchsone dicarboxylic acid (prepared by condensation of p-tolyl amino benzaldehyde and 2-hydroxy-3-methylbenzoic acid and oxidation of the leuco compound), dimethyl oxyfuchsone dicarboxylic acid (prepared as described above using benzaldehyde as starting compound), triphenylmethane dyestuffs as described for example in the British patent specification 790,023 or the dyestuffs described in U.S. patent specification 2,282,890. As binding agents for the anti-halation layer can be used all layer-forming polymers meeting the requirements described above e.g. polycarbonates particularly those on the basis of bis-hydroxy phenyl alkanes, e.g. as described in the British patent specification 817,240, alkali-soluble copolymers containing at least one of the following components: maleic acid, semi esters of maleic acid with lower aliphatic alcohols, acrylic acid, methacrylic acid, vinyl ether such as vinyl butylether, styrene, acrylonitrile, furthermore acid-modified formaldehyde resins such as condensation products of salicylic acid, phenoxy acetic acid or o-methoxy benzoic acid with formaldehyde as descibed for example in U.S. patent specification 2,075,145, 2,089,764 and 2,282,890, reaction products of polyvinyl alcohol with phthalic acid and the like.

The matted anti-halation layer according to the invention can be used for any photographic material, whereby on the opposite side of the support which may consist of any suitable polymeric material such as cellulose esters, polycarbonates especially on the basis of bis-hydroxy phenyl alkanes, polyesters such as reaction products of terephthalic acid and ethylene glycol, polystyrenes and the like is coated with a lightsensitive silver halide emulsion. In the case of a multilayer color film the opposite side of the support contains three emulsions layers sensitive to different spectral regions and if desirable, additional auxiliary layers.

We claim:
1. A light-sensitive photographic film comprising a transparent support coated on one side with at least one light-sensitive silver halide emulsion layer and on the other side with a matted antihalation layer consisting essentially of

(i) a film-forming binder that is soluble in aqueous photographic processing baths,
(ii) an antihalation dye, and (iii) heterogeneously dispersed throughout the binder, as a matting agent, an ester of cellulose with (a) acetic acid and (b) a dicarboxylic acid, said ester containing free acid radicals, having an acid number (milliliters of 0.5-molar potassium hydroxide per gram) between 4 and 8, and being present in an amount between 1 and 10 parts by weight of the cellulose ester to each 12 parts by weight of the binder.

2. A light-sensitive photographic film as defined in claim 1 in which the cellulose ester is a cellulose acetate which has an acetic acid content between 35 and 50%, has an acid number (milliliters of 0.5-molar potassium hydroxide solution per gram) between 4.8 and 6.0, and a 5% solution of which in aqueous acetone (80% by volume of acetone) has a viscosity between 2 and 100 centipoises.

3. A light-sensitive photographic film as defined in claim 1 in which the dicarboxylic acid with which the cellulose has been esterified is a dicarboxylic acid of the group consisting of malonic, succinic, maleic, citraconic, and phthalic acids.

4. A light-sensitive photographic film as defined in claim 1 in which the cellulose ester has an acid number (milliliters of 0.5-molar potassium hydroxide solution per gram) between 4.8 and 6.0.

5. A light-sensitive photographic film as defined in claim 1 in which the cellulose ester is a cellulose acetate maleate.

6. A light-sensitive photographic film as defined in claim 1 in which the cellulose ester is a cellulose acetate phthalate.

7. A light-sensitive photographic film as defined in claim 1 in which the binder of the antihalation layer is a copolymer containing at least two members of the group consisting of vinyl butyl ether, acrylonitrile, styrene, maleic acid and monoesters of maleic acid.

8. A light-sensitive photographic film as defined in claim 1 in which the binder of the antihalation layer is a copolymer of vinyl butyl ether, acrylonitrile and a monoester of maleic acid and the cellulose ester is cellulose acetate phthalate.

References Cited by the Examiner
UNITED STATES PATENTS

| | | | |
|---|---|---|---|
| 2,000,587 | 5/1935 | Fordyce | 96—84 |
| 2,161,788 | 6/1939 | Wilmanns et al. | 96—84 |
| 2,289,799 | 7/1942 | Nadeau et al. | 96—84 |
| 2,335,944 | 12/1943 | Jung et al. | 96—84 |
| 2,346,078 | 4/1944 | Nadeau et al. | 96—84 |
| 3,022,171 | 2/1962 | Ossenbrunner et al. | 96—84 |
| 3,072,482 | 1/1963 | Beeber et al. | 96—75 |

NORMAN G. TORCHIN, *Primary Examiner.*

A. LIBERMAN, R. H. SMITH, *Assistant Examiners.*